(12) United States Patent
Sykes et al.

(10) Patent No.: US 7,115,834 B2
(45) Date of Patent: Oct. 3, 2006

(54) METHOD AND APPARATUS OF ELECTRONIC SELECTION OF AN OUTPUT MODE OF A WELDING POWER SOURCE

(75) Inventors: Allen Sykes, Greenville, WI (US); David Kraus, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 136 days.

(21) Appl. No.: 10/605,018

(22) Filed: Sep. 2, 2003

(65) Prior Publication Data
US 2005/0045608 A1    Mar. 3, 2005

(51) Int. Cl.
*B23K 9/10* (2006.01)
(52) U.S. Cl. .................................................. 219/130.1
(58) Field of Classification Search ............. 219/130.1, 219/130.21, 130.31, 130.32, 130.33, 130.5
See application file for complete search history.

(56) References Cited

U.S. PATENT DOCUMENTS

| | | | | |
|---|---|---|---|---|
| 2,597,689 A | * | 5/1952 | Welch, Jr. ................... | 323/347 |
| 3,130,295 A | * | 4/1964 | Manz ....................... | 219/130.1 |
| 3,544,759 A | * | 12/1970 | Manz ....................... | 219/130.1 |
| 4,517,439 A | * | 5/1985 | Colley .................... | 219/130.33 |
| 4,918,285 A | * | 4/1990 | Thommes ................ | 219/130.1 |
| 6,028,290 A | * | 2/2000 | Yasuhara et al. ........ | 219/130.1 |
| 6,037,566 A | * | 3/2000 | Yasuhara et al. ........ | 219/130.1 |

OTHER PUBLICATIONS

Gutzwiller, ed., SCR Manual, 4th edition, 1967, General Electric, pp. 143-144.*

* cited by examiner

*Primary Examiner*—Clifford C. Shaw
(74) *Attorney, Agent, or Firm*—Ziolkowski Patent Solutions Group, SC

(57) ABSTRACT

The present invention provides a method and apparatus of electronically selecting an output mode of a welding power source. The invention includes operational circuitry that electronically energizes an output terminal based on a user selected parameter. Specifically, a series of power switches is selectively biased based on a particular output mode selection by the user. As such, independent output terminals of the power source may be activated without requiring mechanical and manual operation by the user.

24 Claims, 3 Drawing Sheets

METHOD AND APPARATUS OF ELECTRONIC SELECTION OF AN OUTPUT MODE OF A WELDING POWER SOURCE

BACKGROUND OF INVENTION

The present invention goes generally to welding systems and, more particularly, to a method and apparatus of electronic selection of an output mode of a welding power source. Specifically, the present invention includes operational circuitry that electronically and selectively energizes an output terminal of the power source based on an output mode selection by a user.

Power sources are commonly used in welding-type processes such as welding, plasma cutting, and induction heating to condition a raw power input from a utility or generator into a form usable by the welding-type process.

Some welding-type processes can be categorized into various modes and power sources have been designed so as to be operable with the various modes. For example, MIG welding, formerly known as Gas Metal Arc Welding (GMAW), is one welding process that combines the techniques and advantages of TIG welding's inert gas shielding with a continuous, consumable wire electrode. Two examples of MIG welding modes are constant voltage (CV) or constant current (CC). Should a user select CV mode, a user selected voltage is generally required. The voltage is an indication of the voltage desired at a point of a weld and is held constant by the power source. It is also necessary to select an initial wire feed speed (WFS). The WFS indicates the speed with which metal filler is delivered to the point of the weld but when the mode is CV, also corresponds to an output current. By holding the output voltage constant, the user can manipulate the output current by adjusting the WFS. Since the WFS is directly proportional to the current delivered to the wire feeder and point of the weld, the higher the WFS, the greater the current delivered to the weld. However, should the user choose CC, the user input current is held constant and the user can adjust the WFS to obtain the desired voltage at the weld. In this case, the user must lower the WFS in order to raise the voltage at the weld or raise the WFS to lower the voltage at the weld.

The above-described arc control process is well known and is a standard technique of controlling the power source to provide a user selected output at the weld. However, it is simply not sufficient with known power sources for the user to identify an output mode. That is, most MIG welding power sources include a CC terminal as well as a CV terminal. Accordingly, if the user intends to carry out a CC welding process, then the weld cable extending from the wire feeder must be connected to the CC terminal of the power source. Conversely, if a CV welding process is to be carried out, then the weld cable extending from the wire feeder must be connected to the CV terminal. Conventional power sources have a mechanical switch that must be manually operated to energize the appropriate output terminal. In this regard, the user must manually select the output inductance and selectively energize a number of capacitive elements such that the appropriate output terminal is energized. The mechanical switch assembly typically found in power sources to selectively energize an output terminal to be consistent with the output mode selected by the user in prescribing a particular welding process is a relatively complex assembly that not only increases the complexity of the power source, but also adds additional cost to the manufacturing process. Additionally, implementing a mechanical switch to energize the appropriate terminal of the power source requires that the user take additional steps to insure proper commencement of the welding process.

Mechanical output mode selector switches is not limited to selection between a CC output terminal and a CV output terminal of a MIG welding power source. That is, power sources have been developed that may be usable to provide power for welding as well as plasma cutting or induction heating. With these power sources, a user must mechanically energize output terminals based on the particular welding-type process to be carried out or load placed on the power source. For example, to switch between welding and plasma cutting, the user must mechanically operate a switch designed to selectively energize an output terminal for plasma cutting rather than an output terminal for welding.

It would therefore be desirable to design a method and apparatus of electronically energizing isolated output terminals based on a user selected welding parameter.

BRIEF DESCRIPTION OF INVENTION

The present invention provides a method and apparatus of electronically selecting an output mode of a welding power source that overcomes the aforementioned drawbacks. The invention includes operational circuitry that electronically energizes an output terminal based on a user selected parameter. Specifically, a series of power switches is selectively biased based on a particular output mode selection by the user. As such, separate output terminals of the power source may be activated without requiring mechanical and manual operation by the user. For example, a CC or CV output terminal may be energized. In another example, selection between a welding and an induction heating or plasma cutting output terminal may be electronically carried out.

Therefore, in accordance with one aspect of the present invention, the welding power source includes a selector circuit configured to electronically energize an output terminal based on a user input to the output mode selector.

According to another aspect of the present invention, a welding power source output mode selector assembly includes a power input and a first inductive element connected to a first mode output and connectable to the power input. The assembly further includes a filter circuit connected to a second mode output and connectable to the power input. A plurality of electronic switches is provided such that wherein activation of a first set of electronic switches an electrical connection is created between the inductive element and the power input and wherein activation of a second set of electrical switches an electrical connection is created between the filter circuit and the power input.

In accordance with yet another aspect of the present invention, a method of electronically selecting an output of a welder includes the step of receiving a user input identifying a desired output mode. From the desired output mode, a set of electronic components is selectively biased. The method further includes the step of energizing either a CC output terminal or a CV output terminal based on the set of electronic components biased.

In a further aspect of the present invention, a kit to retrofit a welder power source to permit electronic selection of an output mode is provided. The kit includes a circuit having a plurality of electronic components such that a first output terminal of the power source is energized when a first set of electronic components is activated and a second set output terminal of the power source is energized when a second set of electronic components is activated.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

The present invention will be described with respect to a power source designed to provide power for a MIG welding process. The present invention, however, is equivalently applicable with power sources for other welding processes as well as plasma cutting and induction heating. In this regard, the present invention is applicable to the electronic selection or energizing independent output terminals of a power source. While the invention will be described with respect to selective energizing of a CC or CV terminal of a power source, the invention is not so limited.

Figure 1:
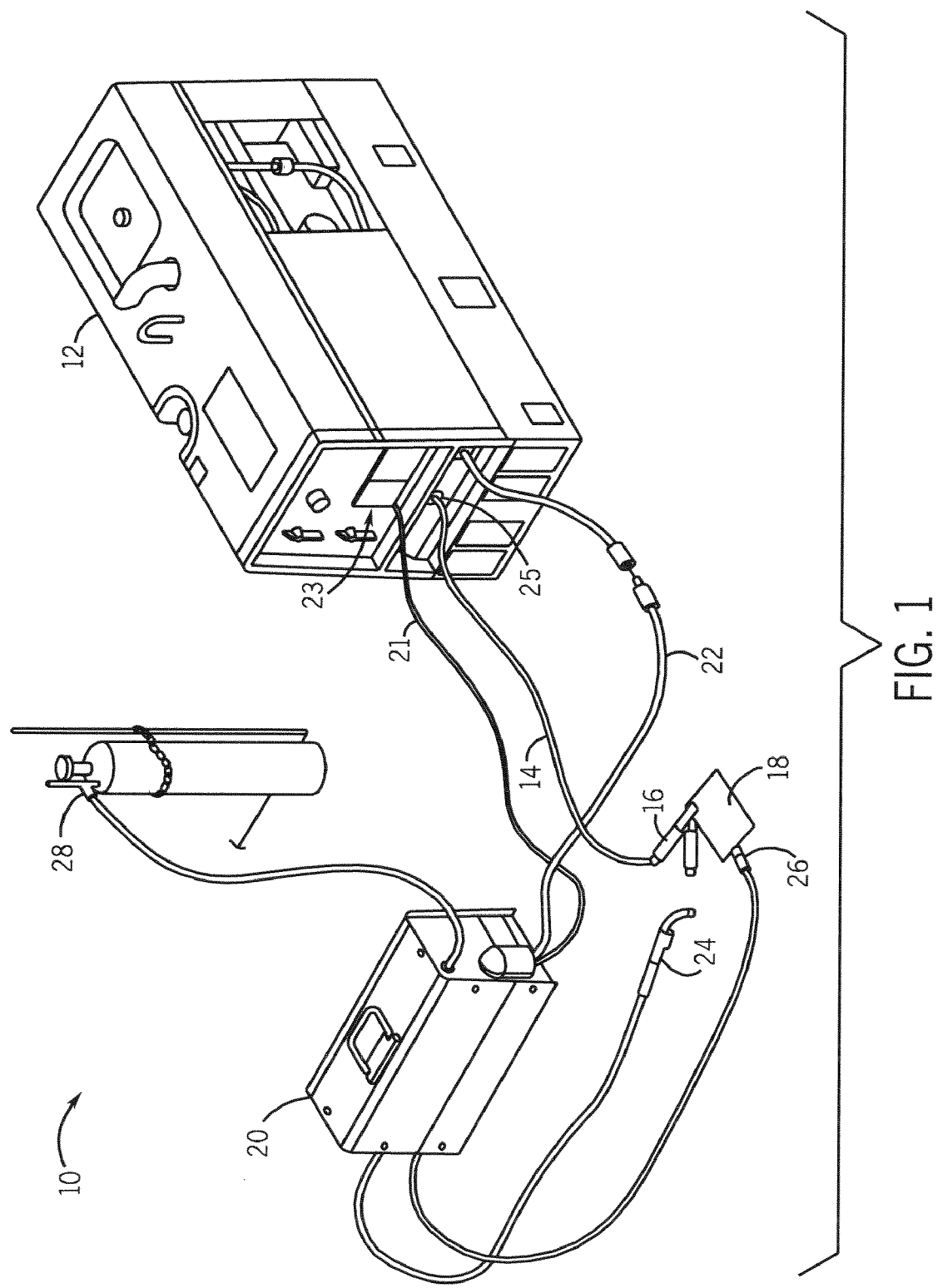
FIG. 1 is a perspective view of an MIG welding system.

Referring to FIG. 1, a welding-type system 10 is shown incorporating the present invention. System 10 includes at least one power source 12, which can be an AC or a DC welding power supply operable in either a constant current (CC) or constant voltage (CV) mode. The power source 12 has a work cable 14 and clamp 16 designed to provide electrical connection to the workpiece 18 for welding. Power source 12 is also connected to a wire feeder 20 via an input cable 21 that is connected to an output terminal of the power source that is shielded by plate 23. The user connects cable 14 to the appropriate terminal, i.e. terminal 25, depending on the output mode of the MIG welding process to be carried out. Also connected between the power source 12 and the wire feeder 20 is a negative weld cable 22. The wire feeder 20 also includes a welding torch or gun 24 and a voltage sensing lead with clip 26 configured to provide voltage at the weld feedback to the wire feeder. A shielding gas cylinder 28 is also connected to the wire feeder 20 to provide shielding gas for the welding process.

The wire feeder includes a wire drive assembly (not shown) that includes a spool of welding wire (not shown) that is supplied to the weld under control of a controller (not shown) that is connected to the power source 12 through cord 21. The controller is governed by a micro-processor capable of being programmed to operate according to certain algorithms and/or programs. User selections or inputs received by the controller from a display and control panel, FIG. 2, and an internally programmed algorithm cause welding system 10 to operate according to the user selections.

When the welding torch 24 is positioned proximate to workpiece 18, welding wire is fed into contact with the workpiece 18. Once triggered, an electrical current and voltage are generated to cause the welding wire to be heated and melt. As a result, an electrical arc is established which causes the welding wire to continue to melt as well as transfer the melted welding wire to the workpiece 18 where the welding wire fuses and cools with the workpiece 18. Because the electrical energy supplied to the welding system is typically greater than that required to melt the welding wire, most of the remaining energy is in the form of heat which is transferred to the surface of the workpiece 18 resulting in the workpiece 18 also melting and improving bonding between the melted welding wire and the workpiece 18. As the welding torch 24 is translated across the workpiece 18, melted welding wire is continuously transferred to the workpiece 18.

In one exemplary embodiment, the wire feeder is configured to operate on 115 VAC control input power with an open circuit/arc voltage weld input power level ranging from approximately 10 volts to 100 volts DC. The power source is designed to operate in either a CC or CV mode. In CC mode, the wire feed speed is generally 30–600 inches per minute (ipm) and in CV mode the speed ranges from 30–60 ipm. The wire feeder is designed to introduce flux cored, solid steel, stainless steel, or the like welding wire to a weld. One skilled in the art would appreciate that these value are illustrative of only one particular welding assembly and that the present invention is equivalently applicable with other welding systems having different operating specifications.

Figure 2:
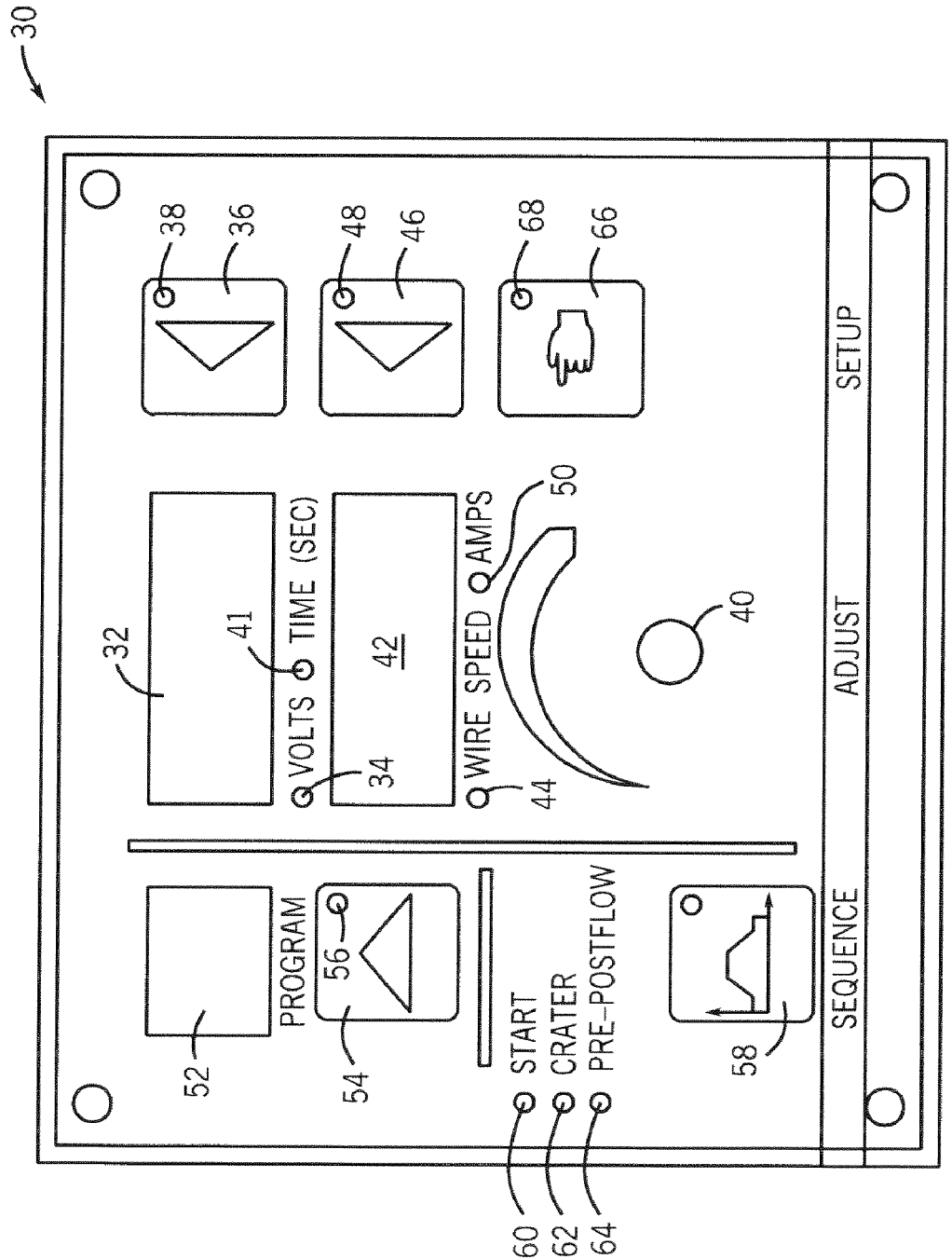
FIG. 2 is a front elevational view of an operator interface to selectively define parameters of a welding process.

FIG. 2 shows a detailed view of the display and control panel 30 of the controller for wire feeder 20. Alternatively, the display and control panel may be integrated with the power source 12. As stated, the display and control panel 30 provides a user interface for the welding-type system 10. An upper display 32 is included to display voltage and/or time information. Voltage information can be displayed for both actual, or output, voltage as well as preset or user input voltages. When displaying voltage information a voltage labeled light emitting diode 34 (LED) is illuminated. The upper display button 36 can be depressed to display, input, or adjust weld time. An upper display button LED 38 accompanies the upper display button 36 to indicate when information displayed in the upper display 32 may be adjusted by an adjustment control 40. By rotating the adjustment control 40 it is possible to increment or decrement the selected item. To change the displayed information, upper display button 36 can be depressed and voltage LED 34 is turned off while a time LED 41 is illuminated. Corresponding to the time LED 41 illumination, upper display 32 displays time information relating to the duration of a welding sequence.

A second, lower display 42 is also included. The lower display 42 displays wire feed speed (WFS) or amperage (current) information. When displaying WFS, a WFS LED 44 is illuminated. Accompanying the lower display 42 is a lower display button 46 that may be depressed to display, input or allow adjustment of either the WFS or current. The lower display button 46 can be used to cause the lower display 42 to display current in amps. If current is displayed, an Amps LED 50 is illuminated. A lower display button LED 48 is illuminated to indicate when it is possible to adjust the information displayed in the lower display 42. When the lower display button LED 48 is illuminated, the adjustment control 40 can be used to adjust the value of the displayed item, i.e. WFS or current.

A program display 52 is also included. The program display 52 is dedicated to displaying information relating to the active or queued programs. A program button 54 allows a user to activate a program select feature. By pressing the program button 54 and rotating the adjustment control 40 the user can cycle through and select various welding programs. A display button LED 56 is illuminated to indicate when the adjustment control 40 is enabled to adjust a program displayed in the program display 52.

A sequence button 58 is included to allow a user selection of welding sequences. Accompanying the sequence button

58 are LEDs that correspond to sections of the welding sequence. In accordance with a preferred embodiment, three LEDs are included to indicate whether the welding sequence is in one of three sections of the welding sequence: start 60, crater 62, or pre-postflow 64.

A setup button 66 is also provided to allow the user to select the mode of operation. The setup button 66 allows the user to cycle through a plurality of menus. In one embodiment, the menus include a mode menu, a run-in menu, a burn-back menu, an auto-flux menu and a units menu. The mode menu allows a user to make a mode selection. As will be described more fully hereinafter, the mode selection may include modes of constant current or constant voltage. Set up button 66 is equipped with a setup button LED 68 to indicate the activation of the setup button, which enables setup selections from the menus. Setup button 66 may be used to enter a selection mode. Once the setup button 66 has been used to access the mode menu, the adjustment control 40 may be used to choose a desired mode. In one embodiment, two modes are included: constant current and constant voltage. However, other modes or variants of these modes are possible and contemplated.

Figure 3:
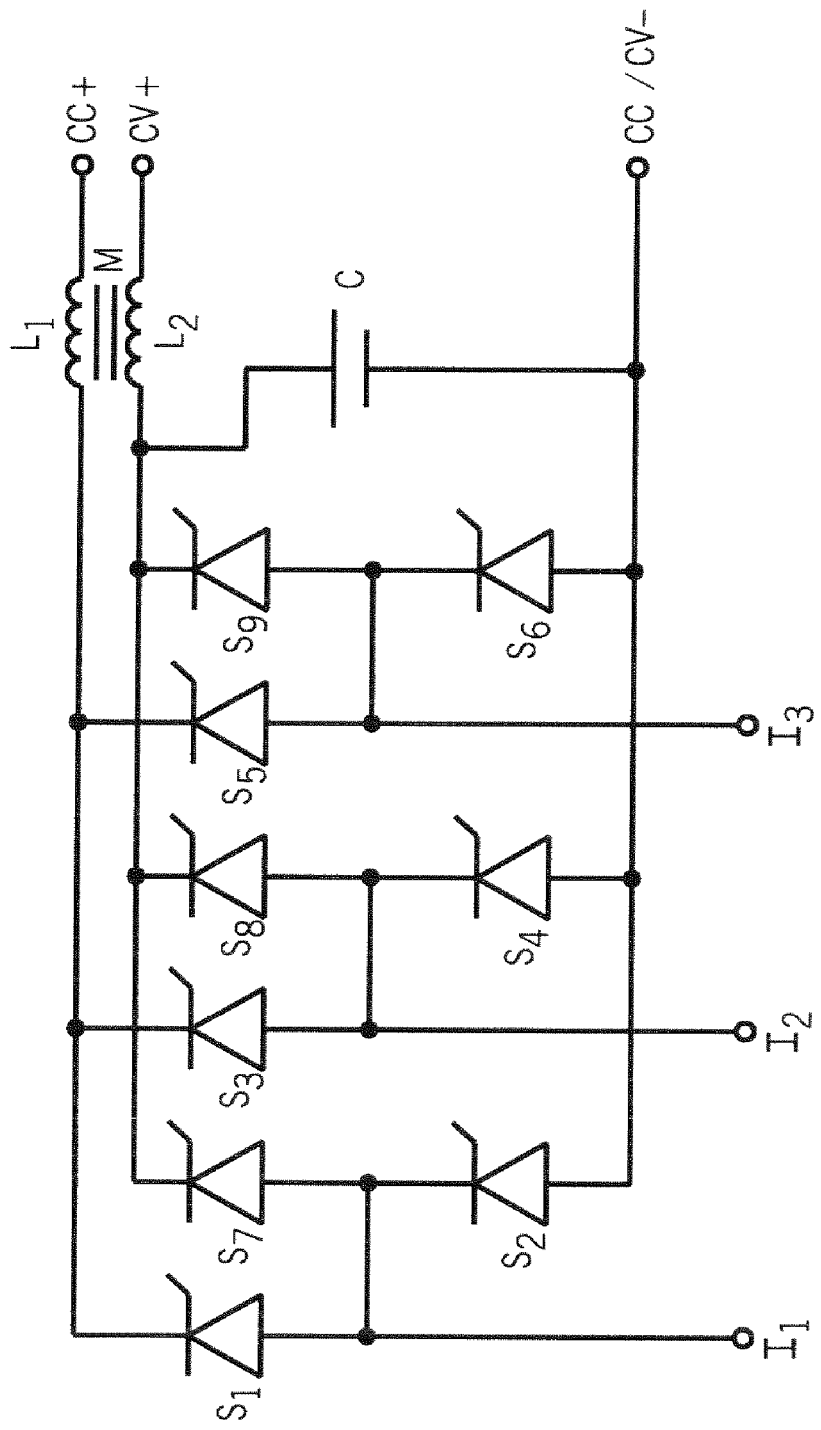
FIG. 3 is a schematic of a mode selector circuit in accordance with one embodiment of the present invention.

Referring now to FIG. 3, a schematic illustrating one example for carrying out the present invention is shown. One skilled in the art will readily appreciate that the circuit schematic illustrated in FIG. 3 sets forth one example in which the present invention may be embodied. That is, other configurations incorporating and embodying the present invention different from that which is expressly shown are contemplated and within the scope of the present invention. Furthermore, the schematic, as shown, is provided as a representation of operational circuitry. That is, while the schematic is designed to illustrate features of the invention, it is not contemplated to encompass all elements of circuitry necessary to implement the current invention or illustrate the only circuit capable of carrying out the invention.

The circuit illustrated in FIG. 3 represents one exemplary embodiment of electronically selecting proper output terminals, inductor, and capacitor connections for a welding process. Preferably, the circuit is incorporated into the arc current control described above. Further, circuit 70 of FIG. 3 is shown as being operable to selectively energize either a CC+ terminal or a CV+ terminal of a power source. However, one skilled in the art will appreciate that the illustrated circuit may be modified to selectively energize other output terminals for other output modes.

Circuit 70 is comprised of a number of electronic switches that are selectively biased to energize independent output terminals, e.g. either a CC+ terminal or a CV+ terminal. Each of the terminals is independent from one another and, as such, one may be energized without energizing the other. The electronic switches illustrated are of a single topology, namely, silicon controlled rectifiers (SCRs). However, one skilled in the art will readily appreciate that other forms of electric/electronic controlled switches are possible and may be implemented in accordance with the present invention. Additionally, circuit 70 may be constructed such that the switches are of a mixed topology. Additionally, circuit 70 is shown with a full control bridge but one skilled in the art will appreciate that a half control bridge may also be implemented.

Circuit 70 is designed to receive a three-phase AC power supply through terminals I1, I2, and I3. However, circuit 70 may be modified in accordance with the invention to receive an input from any number of phases. Circuit 70 is constructed such that when the user sets the output mode as constant current, switches S1, S2, S3, S4, S5, and S6 are energized or biased to provide controlled power from the AC inputs through inductor L1 to the CC+ terminal and the common negative CC/CV terminal. Accordingly, during this condition, the CV+ output terminal is not energized and the capacitor C is disconnected from the energized output terminal. In contrast, when the user sets the desired output as a constant voltage output, switching devices S7, S2, S8, S4, S9, and S6 are energized to provide controlled power from the AC input to the capacitor C through the inductor L2 to the CV+ terminal and the common negative terminal. During this condition, the CC+ output terminal is not energized.

One skilled in the art will appreciate that the number of switches illustrated in circuit 70 is one example in which the present invention may be implemented in that additional or fewer switches of less or more capacity may be equivalently used to electronically energize the appropriate output terminal. Additionally, circuit 70 includes a bridge with shared positive or negative switches. However, one skilled in the art will appreciate that two complete bridges without any shared switches and connected at either the positive or negative bus may be possible and is contemplated. Further, each output inductor L1 and L2 is shown with a shared magnetic assembly M. However, circuit 70 may be constructed such that each inductor has a separate and independent magnetic assembly. Additionally, one skilled in the art will appreciate that the filter circuit is not required and, therefore, may be removed from the switching circuit without deviating from the scope of this invention.

As one skilled in the art will fully appreciate, the heretofore description of welding devices not only includes welders, but also includes any system that requires high power outputs, such as heating and cutting systems. Therefore, the present invention is equivalently applicable with any device requiring high power output, including welders, plasma cutters, induction heaters, and the like. Reference to welding power, welding-type power, or welders generally, includes welding, cutting, or heating power. Description of a welding apparatus illustrates just one embodiment in which the present invention may be implemented. The present invention is equivalently applicable with many high power systems, such as cutting and induction heating systems, or any similar systems.

Therefore, in accordance with one embodiment of the present invention, the welding power source includes a selector configured to electronically energize an output terminal based on a user input to the output mode selector.

According to another embodiment of the present invention, a welding power source output mode selector assembly includes a power input and a first inductive element connected to a first mode output and connectable to the power input. The assembly further includes a filter circuit connected to a second mode output and connectable to the power input. A plurality of electronic switches is provided such that wherein activation of a first set of electronic switches an electrical connection is created between the inductive element and the power input and wherein activation of a second set of electrical switches an electrical connection is created between the filter circuit and the power input.

In accordance with yet another embodiment of the present invention, a method of electronically selecting an output of a welder includes the step of receiving a user input identifying a desired output mode. From the desired output mode, a set of electronic components is selectively biased. The method further includes the step of energizing either a CC output terminal or a CV output terminal based on the set of electronic components biased.

The present invention has been described in terms of the preferred embodiment, and it is recognized that equivalents, alternatives, and modifications, aside from those expressly stated, are possible and within the scope of the appending claims.

What is claimed is:

1. A welding power source comprising:
   an output mode selector configured to enable a user to identify one of a number of welding processes for which the power source is capable of providing power;
   a selector circuit configured to electronically energize an output terminal based on a user input to the output mode selector such that power delivered to the terminal is matched to the welding process identified by the user via the output mode selector, wherein the selector circuit includes a first set and a second set of electronic switches, wherein the first set of electronic switches is configured to be activated when a first output mode is selected and the second set of electronic switches is configured to be activated when a second output mode is selected; and
   an LC filter circuit connected to the second set of electronic switches to provide a filtered output when the second output mode is selected.

2. The power source of claim 1 wherein the output mode includes one of a constant current (CC) mode and a constant voltage (CV) mode and the output terminal is either a CC output terminal or a CV output terminal.

3. The power source of claim 1 wherein the first set and the second set of electronic switches include SCRs.

4. The power source of claim 1 wherein each set of electronic switches includes a single topology of electronic components.

5. The power source of claim 1 wherein the selector circuit is configured to receive an AC power input from any number of phases.

6. The power source of claim 1 further comprising a common negative terminal.

7. A welding power source output mode selector assembly comprising:
   a power input;
   a first inductive element connected to a first mode output and connectable to the power input;
   an LC filter circuit connected to a second mode output and connectable to the power input; and
   a plurality of electronic switches wherein activation of a first set of electronic switches causes an electrical connection between the inductive element and the power input, and wherein activation of a second set of electrical switches causes an electrical connection between the filter circuit and the power input.

8. The assembly of claim 7 wherein the power input includes an AC input of any number of phases.

9. The assembly of claim 7 wherein the first mode includes a constant current output.

10. The assembly of claim 7 wherein the second mode includes a constant voltage output.

11. The assembly of claim 7 wherein the plurality of electronic switches includes a plurality of SCRs.

12. The assembly of claim 7 wherein the LC filter circuit includes a second inductive element, and wherein the first inductive element and the second inductive element share a magnetic assembly.

13. The assembly of claim 7 wherein the plurality of electrical switches are of a common topology.

14. The assembly of claim 7 where the plurality of electrical switches is arranged in one of a single control bridge and a pair of electrically isolated control bridges.

15. The assembly of claim 14 wherein the single control bridge includes one of a full control bridge and a half control bridge.

16. The assembly of claim 14 wherein the single control bridge includes one of a common negative output and a common positive output.

17. A method of electronically selecting an output of a welder, the method comprising the steps of:
   receiving a user input identifying either a CC or a CV mode of operation for the welder;
   from the identified mode of operation, selectively biasing a set of electronic components; and
   energizing either a CC output terminal or a CV output terminal based on the set of electronic components biased, the CV output terminal connected to the biased set of electronic components across an LC circuit.

18. The method of claim 17 further comprising the step of biasing the set of electronic components with an AC input with one or more phases.

19. The method of claim 17 wherein the set of electronic components includes a plurality of SCRs.

20. The method of claim 17 wherein the set of electronic components includes a plurality of switches of common topology.

21. The method of claim 17 further comprising the step of biasing another set of electronic components and energizing the other of the CC output terminal or CV output terminal based on the another set of electronic components biased.

22. A kit to retrofit a welder power source to permit electronic selection of an output mode, the kit comprising a circuit having a plurality of electronic components such that a first output terminal of the power source is energized when a first set of electronic components is activated to provide power for a first type of welding process and a second output terminal of the power source is energized when a second set of electronic components is activated to provide power for a second type of welding process dissimilar from the first type of welding process, wherein the circuit includes an LC filter connected to the second output terminal.

23. The kit of claim 22 wherein the plurality of electronic components is of a mixed topology, and the first type of welding process is a CC welding process and the second type of welding process is a CV welding process.

24. The kit of claim 22 wherein the circuit includes a pair of output inductors wherein each inductor has a respective magnetic assembly.

* * * * *